United States Patent

Suzuki et al.

[11] Patent Number: 6,051,645
[45] Date of Patent: Apr. 18, 2000

[54] INK JET RECORDING INK AND INK JET RECORDING METHOD

[75] Inventors: Atsushi Suzuki; Toshitake Yui; Nobuyuki Ichizawa; Kunichi Yamashita; Ken Hashimoto, all of Minami-Ashigara, Japan

[73] Assignee: Fuji Xerox Co., Ltd., Tokyo, Japan

[21] Appl. No.: 08/843,167

[22] Filed: Apr. 14, 1997

[30] Foreign Application Priority Data

Apr. 17, 1996 [JP] Japan .................................. 8-095497

[51] Int. Cl.$^7$ ....................................... C08K 5/04
[52] U.S. Cl. ..................... 524/500; 524/513; 524/514; 524/521
[58] Field of Search ..................... 524/521, 513, 524/514, 500

[56] References Cited

U.S. PATENT DOCUMENTS

| | | |
|---|---|---|
| 4,597,794 | 7/1986 | Ohta et al. . |
| 4,680,332 | 7/1987 | Hair et al. ................ 524/561 |
| 5,085,698 | 2/1992 | Ma et al. . |
| 5,217,255 | 6/1993 | Liu et al. ................ 524/521 |
| 5,221,334 | 6/1993 | Ma et al. . |
| 5,536,306 | 7/1996 | Johnson et al. . |
| 5,596,027 | 1/1997 | Mead et al. ............... 524/514 |
| 5,626,655 | 5/1997 | Pawlowski et al. . |
| 5,648,405 | 7/1997 | Ma et al. ................. 524/514 |

FOREIGN PATENT DOCUMENTS

| | | |
|---|---|---|
| 56-147868 | 11/1981 | Japan . |
| 56-147871 | 11/1981 | Japan . |
| 1-301760 | 12/1989 | Japan . |
| 5-263029 | 10/1993 | Japan . |
| 6-100810 | 4/1994 | Japan . |
| 6-264017 | 9/1994 | Japan . |
| 6-306317 | 11/1994 | Japan . |

*Primary Examiner*—Bernard Lipman
*Attorney, Agent, or Firm*—Oliff & Berridge, PLC

[57] ABSTRACT

An ink jet recording ink comprising water, a coloring material, a water-soluble organic solvent and a plurality of dispersants each having a different HLB, and an ink jet recording method using this ink jet recording ink are disclosed. Preferably, given that respective HLBs of n (n≧2) kinds of dispersants are such that $HLB_1 < HLB_2 < \ldots < HLB_n$, at least two dispersants satisfy the following formula:

$$1 \leq HLB_x - HLB_{x-1} \leq 30$$

(wherein, X is an integer from 2 to n). The ink jet recording ink and ink jet recording method of the present invention do not clog a nozzle, have an excellent dispersion stability, discharge responsiveness and discharge stability, and provide uniform images having high resolution and high optical density stably.

15 Claims, No Drawings

INK JET RECORDING INK AND INK JET RECORDING METHOD

BACKGROUND OF THE INVENTION

1. Field of the Invention

The present invention relates to an ink jet recording ink and an ink jet recording method.

2. Description of the Related Art

In the principle of ink jet recording methods, images are recorded on recording media such as paper, cloth or film by discharging liquid or molten solid ink through nozzles, slits, a porous film or the like. A variety of methods such as a so-called electric charge control method in which ink is discharged by utilizing electrostatic attracting force, a method in which ink is discharged by utilizing the vibration pressure of a piezo-electric element, a thermal ink jet method in which ink is discharged by utilizing the pressure generated by forming foam using heat have been suggested as the method for discharging ink. Ink jet recording apparatus ensuing these recording methods can provide images having extremely high resolution.

The following characteristics are required for inks used in these ink jet recording apparatuses:

(1) A uniform image having high resolution and high optical density and having no blotting and no fogging can be obtained on a paper sheet,
(2) The leading end of a nozzle is not clogged with dried ink because such clogging prevents the excellent discharge responsiveness and discharge stability required of the ink jet recording apparatus,
(3) The ink dries quickly on a paper sheet,
(4) The resultant image has excellent fastness, and
(5) The ink has excellent storage stability for a long period of time.

Inks in which a water-soluble dye is dissolved into an aqueous medium such as water, water-soluble organic solvent or the like are mainly used as the ink used for these ink jet recording methods. However, the inks using a water-soluble dye have inferior water resistance and light resistance.

Therefore, to solve these problems, inks in which a pigment is dispersed in an aqueous medium such as water, water-soluble organic solvent or the like have been investigated. Examples of such inks include an ink comprising a high-molecular dispersant together with an anionic surfactant (Japanese Patent Application Laid-Open (JP-A) No. 56(1981)-147868), an ink comprising a high-molecular dispersant together with a nonionic surfactant (Japanese Patent Application Laid-Open (JP-A) No. 56(1981)-147871), an ink in which a treated pigment is dispersed by a surfactant having a HLB of 8 or more (Japanese Patent Application Laid-Open (JP-A) No. 1(1989)-301760), an ink using polyvinyl pyrrolidone and/or polyvinyl alcohol (Japanese Patent Application Laid-Open (JP-A) No. 5(1993)-263029), an ink using as a dispersant a block copolymer (U.S. Pat. Nos. 5,085,698, 5,221,334), an ink using as a dispersant agraft copolymer (Japanese Patent Application Laid-Open (JP-A) No. 6(1994)-100810), an ink using a high-molecular dispersant obtained by copolymerizing a high-molecular dispersant having a hydrophilic portion and hydrophobic portion with a monomer having a nonionic group (Japanese Patent Application Laid-Open (JP-A) Nos. 6(1994)-264017, 6(1994)-306317), and the like. However, these inks can not satisfy all requirements, and in particular, have problems such as deterioration of storage stability due to aggregation of a pigment, clogging in the leading end of a minute nozzle, and aggravation of discharge stability in use for a long period of time.

SUMMARY OF THE INVENTION

The first object of the present invention is to provide ink jet recording inks which can solve technical problems described above, can provide uniform images having high resolution and high optical density and having no blotting and no fogging on a paper sheet, cause no clogging in the leading end of a nozzle due to the drying of the ink, have always excellent discharge responsiveness and discharge stability, dries quickly on a paper sheet, and have excellent storage stability for a long period of time.

The second object of the present invention is to provide an ink jet recording method using the above-mentioned ink jet recording ink.

The first aspect of the present invention is an ink jet recording ink comprising water, a coloring material, a water-soluble organic solvent and a plurality of dispersants each having a different HLB.

The second aspect of the present invention is an ink jet recording method which records images by discharging ink drops from an orifice in accordance with recording signals, wherein an ink jet recording ink comprising water, a coloring material, a water-soluble organic solvent and a plurality of dispersants each having a different HLB is used as said ink.

In the ink jet recording ink which comprises water, a coloring material, a water-soluble organic solvent and dispersants, dispersion of the pigment in the aqueous medium containing the water-soluble organic solvent can be stabilized to a certain extent by selecting optimum dispersants. However, it is difficult to prevent clogging in the leading end of a nozzle due to the drying of the ink. It is hypothesized that the reason for this phenomenon is that when ink dries in the leading end of a nozzle, water evaporates and the ink composition in the leading end of the nozzle changes into a composition containing a high proportion of the water-soluble organic solvent so as to cause dispersion instability of the pigment, deposition of the pigment and gelling of the ink, which result in clogging. It is very difficult for a conventionally used dispersant to disperse the pigment stably even when there is a change in the composition of the ink, particularly in the ratio of water to the water-soluble organic solvent.

However, ink jet recording inks of the present invention comprising water, a coloring material, a water-soluble organic solvent and a plurality of dispersants each having a different HLB have excellent dispersion stability and can prevent clogging in the leading end of a nozzle due to the drying of the ink. It is hypothesized that the reason for this phenomenon is that even when the ratio of water to the water-soluble organic solvent in the ink changes, a plurality of dispersants each having a different HLB keep optimum dispersion condition of the pigment. Namely, it is believed that when the water content of the ink is large, the dispersant having higher HLB (having higher hydrophilicity) contributes to the dispersion stability of the pigment, and when the hydrophobicity of the aqueous medium becomes higher due to water evaporation, the dispersant having lower HLB (having higher hydrophobicity) contributes to the dispersion stability of the pigment.

Further, when conventional ink is heated by a heater in a thermal ink jet type printer, the dispersion of the pigment becomes unstable, so-called kogation occurs in which the pigment and dispersants aggregate and deposit on the heater, and discharge of the ink tends to be unstable. However, in the case of the ink jet recording inks of the present invention, the dispersion stability of the pigment can be kept stable even when it is heated, kogation is not caused after continuous discharge of ink, and stable printing becomes possible.

Further, in ink jet recording inks which comprise water, a water-soluble organic solvent, a dye, and dispersants, there occur clogging in the leading end of a nozzle due to the drying of the ink and kogation due to the thermal ink jet method, which cause discharge failure of the ink. These problems become particularly remarkable when a dye having low water- solubility is used in order to improve water resistance of the printed image. It is hypothesized that the reason for this phenomenon is that water evaporates in the leading end of a nozzle and consequently the dye having low water-solubility deposits and adheres to around the nozzle, or the characteristics of the dye change by heat, water-solubility of the dye deteriorates and consequently the dye deposits on the heater.

However, ink jet recording inks of the present invention comprising greater than or equal to two dispersants each having a different HLB, can improve the above-described problems. It is hypothesized that the reason for this phenomenon is that the mixture of greater than or equal to two dispersants each having a different HLB disperses the dye whose water-solubility deteriorates into an aqueous medium to provide higher dispersion stability than that obtained by one dispersant, inhibit the adhesion and deposition on the leading end of a nozzle and the heater and, thereby, improve the discharge failure due to the adhesion and deposition.

As described above, according to the present invention, there can be provided ink jet recording inks which maintains excellent dispersion stability in any environment, does not cause clogging when stored for a long period of time, fixes strongly to various paper sheets and does not cause kogation even when used in the printer of a thermal ink jet method, and an ink jet recording method using above inks.

DETAILED DESCRIPTION OF THE PREFERRED EMBODIMENT

Ink jet recording inks of the present invention comprise as a dispersant greater than or equal to two dispersants each having a different HLB. There have been suggested various methods to measure and calculate HLB, and the calculated HLBs slightly differ in accordance with the method of calculation. In the present invention, HLBs are represented by the following equation which was suggested by Davies in 1957:

HLB=7+Σ(the number of hydrophilic groups)+Σ(the number of lipophilic groups)

In the present invention, the number, n, of dispersants each having a different HLB which is defined by this formula is required to be 2 or more, and the number is preferably from 2 to 3. Given that respective HLBs of n (n≧2) kinds of dispersants are such that $HLB_1 < HLB_2 < \ldots < HLB_n$, it is preferable that at least two dispersants satisfy the following formula:

$1 \leq HLB_x - HLB_{x-1} \leq 30$ (wherein X is an integer from 2 to n)
Namely, it is desired that the difference between at least two dispersants is from 1 to 30, and more preferably from 2 to 25, most preferably from 12 to 20.

In ink jet recording inks of the present invention, when the difference between at least two dispersants is less than 1 or more than 30, problems such as variation in dot diameters, clogging in a nozzle and the like easily occur and the effect of use of dispersants is not fully manifested.

For example, if the number of dispersants is 3 or more, it is most preferable that each difference between adjacent two HLBs is in the range from 1 to 30 when HLBs are arranged in descending order (or in ascending order). However, when the difference between HLBs of at least two dispersants is in the range from 1 to 30, the differes between HLBs of the other pairs are not necessarily required to be in the range from 1 to 30.

In the present invention, given that respective HLBs of n (n≧2) kinds of dispersants are $HLB_1, HLB_2, \ldots, HLB_n$ and respective weights are $W_1, W_2, \ldots, W_n$, the average HLB of the mixture of n kinds of dispersants is represented by the following formula. Namely, the average HLB is defined by the weighted mean of HLBs of respective dispersants.

$$10 \leq \frac{\sum (W_Y \times HLB_Y)}{\sum W_Y} \leq 40$$

(wherein Y is an integer from 1 to n)

In ink jet recording inks of the present invention, the average HLB of the mixture of dispersants is preferably from 10 to 40, more preferably from 12 to 30, further preferably from 18 to 22. When the average HLB of the mixture of dispersants is less than 10, hydrophobicity of the dispersants is too high and it is difficult to disperse the dispersants in an aqueous medium, therefore, problems such as variation in dot diameters, clogging in a nozzle and the like easily occur. When the average HLB of the mixture of dispersants is more than 40, hydrophobicity of the dispersants is too low, adsorbability between the pigment and the dispersants is low, and dispersion stability of ink tends to lower.

As the dispersant used in an ink jet recording ink of the present invention, a high-molecular dispersant is preferably used in addition to publicly-known surfactants. As the high-molecular dispersant, polymers having a hydrophilic portion and hydrophobic portion can be used. As the polymer having a hydrophilic portion and hydrophobic portion, condensation polymers and addition polymers can be used. Examples of the condensation polymers include publicly-known polyester dispersants. Examples of the addition polymers include addition polymers of a monomer having an α,β-ethylenic unsaturated group. Desired high-molecular dispersants can be obtained by selecting a suitable combination of a monomer having an α,β-ethylenic unsaturated group which has a hydrophilic group and a monomer having an α,β-ethylenic unsaturated group which has a hydrophobic group, and by copolymerizing these monomers. Also, homopolymers of a monomer having an α,β-ethylenic unsaturated group which has a hydrophilic group can be used as the high-molecular dispersant.

Examples of the monomer having an α,β-ethylenic unsaturated group which has a hydrophilic group include monomers having a carboxyl group, sulfonic group and the like, such as acrylic acid, methacrylic acid, crotonic acid, itaconic acid, mono ester of itaconic acid, maleic acid, mono ester of maleic acid, fumaric acid, mono ester of fumaric acid, vinyl sulfonic acid, styrene sulfonic acid, sulfonated vinylnaphthalene and the like. Examples of the monomer having an α,β-ethylenic unsaturated group which has a hydrophobic group include styrene derivatives such as styrene, α-methylstyrene, vinyl toluene and the like, vinylnaphthalene, vinylnaphthalene derivatives, alkyl acrylates, alkyl methacrylates, alkyl crotonates, dialkyl itaconates, dialkyl maleates, and the like.

Examples of the preferable copolymer include styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkyl acrylate/acrylic acid copolymers, alkyl methacrylate/methacrylic acid copolymers, styrene/alkyl methacrylate/methacrylic acid terpolymers, styrene/alkyl acrylate/acrylic acid terpolymers, and the like. The number of carbon atoms in the above-mentioned alkyl ester is preferably from 1 to 6. Further, these polymers may be copolymerized with a monomer having a polyoxyethylene group or hydroxyl group, if necessary. The above-mentioned copolymer may be also copolymerized with a monomer having cationic functional group, for example, N,N-dimethylaminoethyl methacrylate, N,N-dimethylaminoethyl acrylate, N,N-dimethylamino methacrylamide, N,N-dimethylamino acrylamide, vinyl pyridine, vinyl pyrrolidone and the like, to enhance hydrophilicity with a pigment having an acidic functional group on the surface and to improve dispersion stability. The copolymer may be any of random, block and graft copolymer.

Also, polystyrenesulfonic acids, polyacrylic acids, polymethacrylic acids, polyvinylsulfonic acids, polyalginic acids, polyoxyethylene/plyoxypropylene block copolymers, condensation products of naphthalenesulfonic acid and formalin, cellulose derivatives such as carboxymethyl cellulose, carboxyethyl cellulose and the like, polysaccharides and derivatives thereof, polyvinylpyrrolidones, polyethyleneimines, polyamines, polyamides and the like can be used as the high-molecular dispersant.

Among these polymers, polymers containing acids as a hydrophilic group are preferably used in the form of salts with basic compounds to enhance water-solubility. Examples of the compounds which form salts with the polymer containing acids as a hydrophilic group include alkaline metals such as sodium, potassium, lithium and the like, aliphatic amines such as monomethylamine, dimethyamine, triethylamine and the like, alcoholamines such as monomethanolamine, monoethanolamine, diethanolamine, triethanolamine, diisopropanolamine and the like, ammonia and the like.

In the present invention, the combination of dispersants can be appropriately selected in consideration of HLBs of various dispersants, and the following combinations are preferably used.

(1) combinations of the salt of a styrene/styrenesulfonic acid copolymer or a partially-sulfonated polystyrene, with at least one of the salt of a n-butyl methacrylate/methacrylic acid copolymer, the salt of a styrene/n-butyl methacrylate/methacrylic acid terpolymer, the salt of a styrene/methacrylic acid copolymer and the salt of a styrene/acrylic acid copolymer, (2) combinations of the salt of polystyrenesulfonic acid, with at least one of the salt of a n-butyl methacrylate/methacrylic acid copolymer, the salt of a styrene/n-butyl methacrylate/methacrylic acid terpolymer, the salt of a styrene/methacrylic acid copolymer and the salt of a styrene/acrylic acid copolymer, or combinations of the salt of polystyrenesulfonic acid, with both of a styrene/acrylic acid copolymer and the salt of a styrene/triethylene glycol methacrylate/styrenesulfonic acid terpolymer, (3) combinations of the salt of a n-butyl methacrylate/methacrylic acid copolymer, with at least one of the salt of a styrene/maleic acid copolymer, the salt of a styrene/methacrylic acid copolymer, the salt of a styrene/acrylic acid copolymer, the salt of a styrene/triethylene glycol methacrylate/methacrylic acid terpolymer, the salt of a styrene/ethoxytriethylene glycol methacrylate/methacrylic acid terpolymer and the salt of a styrene/ethoxytriethylene glycol methacrylate/styrenesulfonic acid terpolymer, (4) combinations of the salt of a styrene/n-butyl methacrylate/methacrylic acid terpolymer, with at least one of the salt of a styrene/maleic acid copolymer, the salt of a styrene/methacrylic acid copolymer and the salt of a styrene/acrylic acid copolymer, (5) combinations of the salt of the condensation product of naphthalene sulfonic acid and formalin, with at least one of the salt of a n-butyl methacrylate/methacrylic acid copolymer, the salt of a styrene/n-butyl methacrylate/methacrylic acid terpolymer and the salt of a styrene/methacrylic acid copolymer, or combinations of the salt of the condensation product of naphthalene sulfonic acid and formalin, with both of the salt of a styrene/methacrylic acid copolymer and polyoxyethylene/polyoxypropylene block copolymer, (6) combinations of the salt of a styrene/acrylic acid copolymer, with at least one of the salt of a styrene/triethylene glycol methacrylate/methacrylic acid terpolymer, the salt of a styrene/ethoxytriethylene glycol methacrylate/methacrylic acid terpolymer and the salt of a styrene/triethylene glycol methacrylate/styrenesulfonic acid terpolymer, or combinations of the salt of a styrene/acrylic acid copolymer, with both of the salt of a styrene/n-butyl methacrylate/methacrylic acid terpolymer and a polyoxyethylene/polyoxypropylene block copolymer, (7) combinations of the salt of a styrene/methacrylic acid copolymer, with at least one of the salt of a styrene/ethoxytriethylene glycol methacrylate/methacrylic acid terpolymer, the salt of a styrene/ethoxytriethylene glycol methacrylate/styrenesulfonic acid terpolymer, a polyoxyethylene/polyoxypropylene block copolymer, the salt of a n-butyl methacrylate/methacrylic acid block copolymer, the salt of a block terpolymer composed of n-butyl methacrylate and 2-hydroxyethyl methacrylate/methacrylic acid copolymer and the salt of a n-butyl methacrylate/dimethylaminoethyl methacrylate/methacrylic acid terpolymer, or combinations of the salt of a styrene/methacrylic acid copolymer, with both of the salt of a n-butyl methacrylate/methacrylic acid copolymer and the salt of a styrene/ethoxytriethylene glycol methacrylate/methacrylic acid terpolymer, both of the salt of a n-butyl methacrylate/methacrylic acid copolymer and a styrene/ethoxytriethylene glycol methacrylate/styrenesulfonic acid terpolymer or both of the salt of a styrene/n-butyl methacrylate/methacrylic acid terpolymer and the salt of a n-butyl methacrylate/dimethylaminoethyl methacrylate/methacrylic acid terpolymer, (8) combinations of the salt of a styrene/2-hydroxyethyl methacrylate/methacrylic acid terpolymer, with the salt of a methyl methacrylate/dimethylaminoethyl methacrylate/methacrylic acid terpolymer.

(9) Combinations other than the above-mentioned combinations may be appropriately selected from the dispersants exemplified in (1) to (8) in consideration of HLB.

(10) Combinations of a known surfactant with the above-described high-molecular dispersant may also be used.

There are known various methods for measuring the weight-average molecular weights of dispersants. In the present invention, the weight-average molecular weights of dispersants are measured by GPC (gel permeation chromatography). The weight-average molecular weights of the high molecular dispersants used in ink jet recording inks of the present invention are preferably from 1000 to 30000, more preferably from 3000 to 15000, and further preferably from 4500 to 10000.

When the weight-average molecular weights of the high molecular dispersants are less than 1000, dispersion of a pigment is unstable and the pigment is likely to aggregate during storage for a long period of time. When the weight-average molecular weights of the high molecular dispersants are more than 30000, the viscosity of ink tends to increase, and discharge of ink drops is liable to be unstable.

In the present invention, a low-molecular dispersant can also be used in addition to a high-molecular dispersant, however, when a low-molecular dispersant is used, the surface tension of inks are liable to lower and qualities of the resulting images are apt to deteriorate. When a high-molecular dispersant is used, such deterioration of a surface tension of inks does not occur and excellent image quality is obtained. Further, a high-molecular dispersant is believed to have steric stability, therefore, dispersion stability obtained by the use of a high-molecular dispersant is higher than that obtained by the use of a low-molecular dispersant. For these reasons, a high-molecular dispersant is preferably used in the present invention.

Various surfactants can be used as the additives for controlling the surface tensions of dispersants and an ink. Examples of a surfactant include anionic surfactants, nonionic surfactants, cationic surfactants, ampholytic surfactants and the like, and the anionic surfactants and nonionic surfactants are preferably used.

Examples of a anionic surfactant include alkylbenzene sulfonates, alkylphenyl sulfonates, alkylnaphthalene sulfonates, salts of higher fatty acids, sulfate salts of higher fatty esters, sulfonates of higher fatty esters, sulfate salts and sulfonates of higher alcohol ethers, higher alkylsulfosuccinates and the like and, more particularly, include dodecylbenzene sulfonate, chelilbenzene sulfonate, isopropylnaphthalene sulfonate, monobutylphenylphenol monosulfonate, monobutylbiphenyl sulfonate, dibutylphenylphenol disulfonate and the like.

Examples of the nonionic surface acitive agent include polyoxyethylenenonylphenyl ethers, polyoxyethyleneoctylphenyl ethers, polyoxyethylenedodecylphenyl ethers, polyoxyethylenealkyl ethers, polyoxyethylene fatty esters, sorbitan fatty esters, polyoxyethylene sorbitan fatty esters, fatty acid alkylolamides, acetylene glycol, oxyethylene adduct of acetylene glycol, and the like.

The amount of dispersants added is selected according to the kind of a coloring material used, particularly pigment. In general, the total amount of dispersants added is from 0.1 to 100 parts by weight, preferably from 1 to 50 parts by weight, more preferably from 3 to 20 parts by weight based on 100 parts by weight of the pigment.

Water used in ink jet recording inks of the present invention is preferably ion exchanged water, ultra pure water, distilled water or ultrafiltered water to prevent mixing of impurity.

As the pigment used as a coloring material in ink jet recording inks of the present invention, any of inorganic pigment and organic pigment can be used. Examples of a black pigment include, but are not limited to, carbon black pigments such as furnace black, lamp black, acetylene black, channel black and the like, and, more particularly, include Raven 7000, Raven 5750, Raven 5250, Raven 5000 ULTRA-, Raven 3500, Raven 2000, Raven 1500, Raven 1250, Raven 1200, Raven 1290 ULTRA-, Raven 1170, Raven 1255 (the above-mentioned compounds are manufactured by Columbian Carbon Corp.), Regal 400, Regal 400R, Regal 330, Regal 330R, Regal 660, Regal 660R, Mogul L, Monarch 700, Monarch 800, Monarch 880, Monarch 900, Monarch 1000, Monarch 1100, Monarch 1300, Monarch 1400 (the above-mentioned compounds are manufactured by Cabot Corp.), Color Black FW1, Color Black FW2, Color Black FW2V, Color Black 18, Color Black FW200, Color Black S150, Color Black S160, Color Black S170, Printex 35, Printex U, Printex V, Printex 140U, Printex 140V, Special Black 6, Special Black 5, Special Black 4A, Special Black 4 (the above-mentioned compounds are manufactured by Degussa Corp.), No. 25, No. 33, No. 40, No. 47, No. 52, No. 900, No. 2300, MCF-88, MA600, MA7, MA8, MA100 (the above-mentioned compounds are manufactured by Mitsubishi Chemical Corporation), and the like. Further, magnetic fine particles such as magnetite, ferrite or the like, titanium black and the like can also be used as the black pigment.

Examples of a cyan pigment include, but are not limited to, C. I. Pigment Blue-1, C. I. Pigment Blue-2, C. I. Pigment Blue-3, C. I. Pigment Blue-15, C. I. Pigment Blue-15:1, C. I. Pigment Blue-15:3, C. I. Pigment Blue- 15:34, C. I. Pigment Blue-16, C. I. Pigment Blue-22, C. I. Pigment Blue-60 and the like.

Examples of a magenta pigment include C. I. Pigment Red 5, C. I. Pigment Red 7, C. I. Pigment Red 12, C. I. Pigment Red 48, C. I. Pigment Red 48:1, C. I. Pigment Red 57, C. I. Pigment Red 112, C. I. Pigment Red 122, C. I. Pigment Red 123, C. I. Pigment Red 146, C. I. Pigment Red 168, C. I. Pigment Red 184, C. I. Pigment Red 202 and the like.

Examples of a yellow pigment include, but are not limited to, C. I. PigmentYellow-1, C. I. PigmentYellow-2, C. I. Pigment Yellow-3, C. I. Pigment Yellow-12, C. I. Pigment Yellow-13, C. I. Pigment Yellow-14, C. I. Pigment Yellow-16, C. I. Pigment Yellow-17, C. I. Pigment Yellow-73, C. I. Pigment Yellow-74, C. I. Pigment Yellow-75, C. I. Pigment Yellow-83, C. I. Pigment Yellow-93, C. I. Pigment Yellow-95, C. I. Pigment Yellow-97, C. I. PigmentYellow-98, C. I. PigmentYellow-114, C. I. Pigment Yellow-128, C. I. Pigment Yellow-129, C. I. Pigment Yellow-151, C. I. Pigment Yellow-154 and the like.

In addition to a black pigment and three primary colors pigments of cyan, magenta and yellow, specific color pigments such as red, green, blue, brown, white or the like, pigments having metallic gloss such as gold, silver or the like, colorless extender pigments, plastic pigments and the like may be used in the present invention. Also, novel pigments may be used. Further, these pigments may be subjected to surface treatment. Examples of a surface treatment include, for example, treatment with alcohol, acid, base, a coupling agent such as silane compound or the like, polymer grafting treatment, plasma treatment and the like.

It is preferable to remove organic and inorganic impurities from these pigments for the purpose of prevention of clogging, and kogation on a heater in thermal ink jet method. In particular, it is desired that the concentration of calcium, iron, silicon, magnesium, phosphorus, zinc and the like in ink is 5 ppm or less. Such removal can be conducted by washing with water, ultra filtration method, ion exchange treatment, adsorption by activated charcoal or zeolite, and the like. In ink jet recording inks of the present invention, the pigment is used in the range from 1 to 20%, preferably from 2 to 10% based on the weight of the ink.

The coloring material used in ink jet recording inks of the present invention includes dyes in addition to the pigments. The effect of the present invention is manifested particularly when ink jet recording inks contain a dye having low water-solubility. Examples of the dye having low water-solubility include dyes in which the number of sulfonic groups contained in the dye molecule is 2 or less and the number of carboxyl groups is higher than the number of sulfonic groups and whose water-solubility is 10% by weight or less at 20° C., and the like.

Examples of the water-soluble organic solvent used in ink jet recording inks of the present invention include polyhydric alcohols such as ethylene glycol, diethylene glycol, propylene glycol, butylene glycol, triethylene glycol, 1,5-pentanediol, 1,2,6-hexanetriol, glycerin and the like, polyhydric alcohol derivatives such as ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, propylene glycol monobutyl ether, dipropylene glycol monobutyl ether and the like, nitrogen-containing solvents such as pyrrolidone, N-methyl-2-pyrrolidone, cyclohexylpyrrolidone, triethanolamine and the like, alcohols such as ethanol, isopropyl alcohol, butyl alcohol, benzyl alcohol and the like, or sulfur-containing solvents such as thiodiethanol, thiodiglycerol, sulfolane, dimethylsulfoxide and the like, propylene carbonate, ethylene carbonate, and the like.

These water-soluble organic solvents may be used alone or in combination. The water-soluble organic solvent is used in the range from 1 to 60%, preferably from 5 to 40% based on the weight of the ink.

Ink jet recording inks of the present invention can comprise polyethyleneimine, polyamines, polyvinylpyrrolidone, polyethylene glycol, cellulose derivatives such as ethyl cellulose, carboxymethyl cellulose and the like, polysaccharides and derivative thereof, water-soluble polymer, polymer emulsion such as acrylic emulsion, polyurethane emulsion and the like, cyclodextrin, macrocyclic amines, dendrimer, crowm ethers, urea and derivative thereof, acetamides, and the like in addition to the above-mentioned components, to control the characteristics of the ink.

Ink jet recording inks can optionally comprise a pH regulator, antioxidant, antifungal agent, viscosity regulator, electro conductive agent, ultraviolet absorbing agent, chelating agent, water-soluble dye, dispersed dye, oil-soluble dye and the like.

Examples of the pH regulator include, for example, potassium hydroxide, sodium hydroxide, lithium hydroxide, ammonium hydroxide, triethanolamine, diethanolamine, ethanolamine, 2-amino-2-ethyl-1-propanol, ammonia and the like. Further, publicly-known pH buffers can also be used as the pH regulator. The pH of the ink is preferably from 6.0 to 11.0, more preferably from 7.5 to 9.0.

The surface tension of the ink is controlled to be within the range from 20 to 65 mN/m, preferably from 30 to 50 mN/m. The viscosity of the ink is controlled to be within the range from 1.0 to 10.0 mPa·s, preferably from 1.5 to 3.5 mPa·s.

Ink jet recording inks of the present invention can be prepared, for example, by adding a predetermined amount of a pigment to an aqueous solution containing a predetermined amount of dispersants, stirring completely the mixture, dispersing the mixture using a dispersing machine, removing coarse particles in the mixture by centrifugal separation and the like, adding a desired solvent, additive and the like to the disperse system, stirring the resulting mixture, and filtering the mixture. Also, inks may be prepared by forming a thick disperse system comprising a pigment, and diluting the disperse system. Further, inks may be prepared by mixing a desired solvent, water and dispersant, adding a pigment to the mixture, and dispersing the resultant mixture using a dispersing machine. Any commercially available dispersing machine, for example, colloid mill, flowjet mill, slasher mill, high speed disperser, ball mill, attritor, sand mill, sand grinder, ultrafine mill, aigarmotor mill, Dyno mill, pearl mill, agitator mill, cobol mill, three-roll, two-roll, extruder, kneader, microfluidizer, laboratory homogenizer, supersonic homogenizer and the like may be used for dispersion and these may be used alone or in combination.

Ink jet recording inks of the present invention can also be used for a recording apparatus equipped with a heater to aid in the fixing of ink to a paper sheet, and a recording apparatus equipped with a intermediate transfer mechanism having an intermediate in which apparatus an ink is applied to an intermidiate an the ink on the intermidiate is transferred onto a recording medium such as a paper sheet or the like, in addition to conventional ink jet recording apparatuses.

The present invention will be illustrated more particularly in accordance with the following examples.

EXAMPLE 1

(preparation of pigment-dispersed liquid)

| | parts by weight |
|---|---|
| Polystyrene/sodium styrenesulfonate polymer (weight-average molecular weight 10000, sulfonation degree 95%, HLB calculated value 40.9) | 0.5 |
| n-butyl methacrylate/sodium methacrylate copolymer (weight-average molecular weight 7500, n-butyl methacrylate/methacrylic acid = 50/50 mol, HLB calculated value 14.1) | 2 |
| Ultra pure water (HLB difference 26.8, the average HLB of a mixture of dispersants = 19.5) | 70 |

The above-described components were mixed, and dispersants were dissolved in water. While this solution was stirred, 10 parts by weight of carbon black (Raven 5250, manufactured by Columbian Carbon Corp.) was added to the solution, the mixture was stirred for 30 minutes, then, this mixture was dispersed by attritor (media: 3 mm diameter SUS beads) for 2 hours, and the coarse particles in the mixture were removed by a centrifugal separator. The pH value of the mixture was controlled to be 9.0 by 1 N NaOH to obtain a dispersed liquid.

(preparation of ink)

| | parts by weight |
|---|---|
| Dispersed liquid (described above) | 45 |
| Diethylene glycol | 7 |
| Glycerin | 4 |
| Isopropyl alcohol | 3 |
| Polyoxyethyleneoleyl ether (oxyethylene = 30 mol) | 0.1 |
| Ultra pure water | 40.9 |

The above-mentioned components were mixed and stirred, and the mixture was filtrated by a membrane filter having a pore size of 1 μm, to obtain an ink.

EXAMPLE 2
(preparation of pigment-dispersed liquid)

|  | parts by weight |
|---|---|
| Polystyrene/sodium styrenesulfonate polymer (weight-average molecular weight 10000, sulfonation degree 95%, HLB calculated value 40.9) | 0.6 |
| Styrene/potassium methacrylate copolymer (weight-average molecular weight 5000, styrene/methacrylic acid = 33/67 mol, HLB calculated value 19.9) | 1.8 |
| Carbon black (Raven 5250, manufactured by Columbian Carbon Corp.) | 10 |
| Ultra pure water (HLB difference 21.0, the average HLB of a mixture of dispersants = 25.2) | 70 |

The above-described components were mixed in the same manner as in Example 1 to obtain a dispersed liquid (pigment concentration 11.0%).

(preparation of ink)

|  | parts by weight |
|---|---|
| Dispersed liquid (described above) | 45 |
| Sulfolane | 9 |
| Diethylene glycol | 6 |
| Surfynol 104 (manufactured by Nisshin Chemical Industry Corp.) | 0.03 |
| Ultra pure water | 39.97 |

The above-mentioned components were mixed and stirred, and the mixture was filtrated by a membrane filter having a pore size of 1 $\mu$m, to obtain an ink.

EXAMPLE 3
(preparation of pigment-dispersed liquid)

|  | parts by weight |
|---|---|
| n-butyl methacrylate/sodium methacrylate copolymer (weight-average molecular weight 7500, n-butyl methacrylate/methacrylic acid = 50/50 mol, HLB calculated value 14.1) | 0.7 |
| Styrene/sodium maleate copolymer (weight-average molecular weight 5000, styrene/methacrylic acid = 50/50 mol, HLB calculated value 28.1) | 0.3 |
| Ultra pure water (HLB difference 14.0, the average HLB of a mixture of dispersants = 18.3) | 70 |

The above-described components were mixed, and dispersants were dissolved in water. While this solution was stirred, 10 parts by weight of carbon black (Regal 330, manufactured by Cabot Corp.) was added to the solution, the mixture was stirred for 30 minutes, then, this mixture was dispersed by Dynomill (media: 0.5 mm diameter zirconia beads) for 1 hour, and the coarse particles in the mixture were removed by a centrifugal separator, to obtain a dispersed liquid.

(preparation of ink)

An ink was prepared in the same manner as in Example 1 except that the above-mentioned dispersed liquid was used in an amount of 45 parts by weight.

EXAMPLE 4
(preparation of pigment-dispersed liquid)

|  | parts by weight |
|---|---|
| Sodium polystyrenesulfonate (weight-average molecular weight 5500, HLB calculated value 41.9) | 0.2 |
| Styrene/sodium styrenesulfonate/triethylene glycol methacrylate terpolymer (weight-average molecular weight 25000, styrene/sodium styrenesulfonate/triethylene glycol methacrylate = 10/60/30 mol, HLB calculated value 2.9.7) | 0.3 |
| Styrene/sodium acrylate copolymer (weight-average molecular weight 3000, styrene/acrylic acid = 67/33 mol, HLB calculated value 10.0) | 0.5 |
| Carbon black (Regal 330, manufactured by Cabot Corp.) | 10 |
| Ultra pure water (HLB difference 12.2, 19.9, the average HLB of a mixutre of dispersants = 22.3) | 70 |

The above-described components were mixed in the same manner as in Example 3 to obtain a dispersed liquid (pigment concentration 11.1%).

(preparation of ink)

|  | parts by weight |
|---|---|
| Dispersed liquid (described above) | 45 |
| Thiodiethanol | 9 |
| Glycerin | 4 |
| Isopropyl alcohol | 3 |
| Urea | 5 |
| Surfynol 465 (manufactured by Nisshin Chemical Industry Corp.) | 0.05 |
| Ultra pure water | 33.95 |

The above-mentioned components were mixed and stirred, and the mixture was filtrated by a membrane filter having a pore size of 1 $\mu$m, to obtain an ink.

EXAMPLE 5
(preparation of pigment-dispersed liquid)

|  | parts by weight |
|---|---|
| Condensation product of naphthalene sulfonic acid and formalin (weight-average molecular weight 4500, HLB calculated value 40.5) | 0.3 |
| Styrene/n-butyl/methacrylate/sodium methacrylate terpolymer (weight-average molecular weight 3000, styrene/n-butyl methacrylate/methacrylic acid = 20/40/40 mol, HLB calculated value 12.2) | 0.9 |
| Ultra pure water (HLB difference 28.3, the average HLB of a mixture of dispersants = 19.3) | 70 |

The above-described components were mixed, and dispersants were dissolved in water. While this solution was stirred, 10 parts by weight of carbon black (Mogul L, manufactured by Cabot Corp.) was added to the solution, the mixture was stirred for 30 minutes, then, this mixture was dispersed by Dynomill (media: 0.5 mm diameter zirconia beads) for 1 hour, and the coarse particles in the mixture were removed by a centrifugal separator, and the pH value of the mixture was controlled to be 9.0 by 1 N NaOH to obtain a dispersed liquid (pigment concentration 11.5%).

(preparation of ink)

| | parts by weight |
|---|---|
| Dispersed liquid (described above) | 45 |
| Thiodiethanol | 8 |
| 2-pyrrolidone | 4 |
| Isopropyl alcohol | 3 |
| Ultra pure water | 40 |

The above-mentioned components were mixed and stirred, and the mixture was filtrated by a membrane filter having a pore size of 1 μm, to obtain an ink.

EXAMPLE 6

(preparation of pigment-dispersed liquid)

| | parts by weight |
|---|---|
| Styrene/sodium acrylate copolymer (weight-average molecular weight 3000, styrene/acrylic acid = 75/25 mol, HLB calculated value 8.3) | 0.9 |
| Styrene/n-butyl methacrylate/sodium methacrylate terpolymer (weight-average molecular weight 5700, styrene/n-butyl/methacrylate/methacrylic acid = 20/40/40 mol, HLB calculated value 12.2) | 0.8 |
| Polyoxyethylene/polyoxypropylene/polyoxyethylene block copolymer (weight-average molecular weight 3000, oxypropylene = 30 mol, oxyethylene = 27 mol, HLB calculated value 14.7) | 0.3 |
| Ultra pure water (HLB difference 2.5, 3.9, the average HLB of a mixture of dispersants = 10.8) | 70 |

The above-described components were mixed, and dispersants were dissolved in water. While this solution was stirred, 10 parts by weight of a copper phthalocyanine pigment (C. I. Pigment Blue-15) was added to the solution, the mixture was stirred for 30 minutes, then, this mixture was dispersed by Dynomill (media: 0.5 mm diameter zirconia beads) for 1 hour, and the coarse particles in the mixture were removed by a centrifugal separator, to obtain a dispersed liquid.

(preparation of ink)

| | parts by weight |
|---|---|
| Dispersed liquid (described above) | 40 |
| Diethylene glycol | 10 |
| Butyl carbitol | 5 |
| Ultra pure water | 45 |

The above-mentioned components were mixed and stirred, and the mixture was dispersed by a ultrasonic homogenizer for 30 minutes and the mixture was filtrated by a membrane filter having a pore size of 1 μm, to obtain an ink.

EXAMPLE 7

(preparation of pigment-dispersed liquid)

| | parts by weight |
|---|---|
| Condensation product of naphthalene sulfonic acid and formalin (weight-average molecular weight 4500, HLB calculated value 40.5) | 0.4 |
| Styrene/potassium methacrylate copolymer (weight-average molecular weight 5000, styrene/methacrylic acid = 33/67 mol, HLB calculated value 19.9) | 1.2 |
| Polyoxyethylene/polyoxypropylene/polyoxyethylene block copolymer (weight-average molecular weight 1700, oxypropylene = 19 mol, oxyethylene = 11 mol, HLB calculated value 10.8) | 0.4 |
| Ultra pure water (HLB difference 20.6, 9.1, the average HLB of a mixture of dispersants = 22.2) | 70 |

The above-described components were mixed, and dispersants were dissolved in water. While this solution was stirred, 10 parts by weight of a quinacridone pigment (C. I. Pigment Red-122) was added to the solution, the mixture was stirred for 30 minutes, then, this mixture was dispersed by Dynomill (media: 0.5 mm diameter zirconia beads) for 1 hour, and the coarse particles in the mixture were removed by a centrifugal separator, to obtain a dispersed liquid.

(preparation of ink)

An ink was prepared in the same manner as in Example 6 except that the above-mentioned dispersed liquid was used in an amount of 40 parts by weight.

EXAMPLE 8

An ink was prepared in the same manner as in Example 7 except that Bisazoyellow pigment (C. I. Pigment Yellow-83) was used in an amount of 10 parts by weight as a pigment.

Comparative Example 1

An ink was prepared in the same manner as in Example 1 except that only a polystyrene/sodium styrenesulfonate polymer (weight-average molecular weight 10000, sulfonation degree 95%, HLB calculated value 40.9) was used in an amount of 2.5 parts by weight as a dispersant.

Comparative Example 2

An ink was prepared in the same manner as in Example 1 except that only a n-butyl methacrylate/sodium methacrylate copolymer (weight-average molecular weight 7500, n-butyl methacrylate/methacrylic acid=50/50 mol, HLB calculated value 14.1) was used in an amount of 2.5 parts by weight as a dispersant.

Comparative Example 3

An ink was prepared in the same manner as in Example 1 except that only a styrene/sodium methacrylate copolymer (weight-average molecular weight 6000, styrene/methacrylic acid=25/75 mol, HLB calculated value 19.5) was used in an amount of 2.5 parts by weight as a dispersant.

Comparative Example 4
(preparation of pigment-dispersed liquid)

|  | parts by weight |
| --- | --- |
| n-butyl methacrylate/sodium methacrylate copolymer (weight-average molecular weight 7500, n-butyl methacrylate/methacrylic acid = 50/50, HLB calculated value 14.1) | 1.0 |
| Styrene/potassium methacrylate copolymer (weight-average molecular weight 5500, styrene/methacrylic acid = 50/50 mol, HLB calculated value 14.1) | 1.5 |
| Carbon black (Regal 330, manufactured by Cabot Corp.) | 10 |
| Ultra pure water | 70 |
| (HLB difference 0, the average HLB of a mixture of dispersants = 14.1) | |

The above-described components were dispersed in the same manner as in Example 3 to obtain a dispersed liquid.
(preparation of ink)
An ink was prepared in the same manner as in Example 1 except that the above-mentioned dispersed liquid was used in an amount of 45 parts by weight.

EXAMPLE 9
(preparation of pigment-dispersed liquid)

|  | parts by weight |
| --- | --- |
| Sodium polystyrenesulfonate (weight-average molecular weight 5500, HLB calculated value 41.9) | 0.5 |
| Styrene/sodium acrylate copolymer (weight-average molecular weight 3200, styrene/acrylic acid = 67/33 mol, HLB calculated value 10.0) | 0.5 |
| Carbon black (Regal 330, manufactured by Cabot corp.) | 10 |
| Ultra pure water | 70 |
| (HLB difference 31.9, the average HLB of a mixture of dispersants = 26.0) | |

The above-described components were dispersed in the same manner as in Example 3 to obtain a dispersed liquid.
(preparation of ink)
An ink was prepared in the same manner as in Example 4 except that the above-mentioned dispersed liquid was used in an amount of 45 parts by weight.

EXAMPLE 10
(preparation of pigment-dispersed liquid)

|  | parts by weight |
| --- | --- |
| Condensation product of naphthalene sulfonic acid and formalin (weight-average molecular weight 4500, HLB calculated value 40.5) | 0.4 |
| Sodium polystyrenesulfonate (weight-average molecular weight 5500, HLB calculated value 41.9) | 0.6 |
| Carbon black (Mogul L, manufactured by Cabot Corp.) | 10 |
| Ultra pure water | 70 |
| (HLB difference 1.4, the average HLB of a mixture of dispersants = 41.9) | |

The above-described components were dispersed in the same manner as in Example 5 to obtain a dispersed liquid.
(preparation of ink)
An ink was prepared in the same manner as in Example 5 except that the above-mentioned dispersed liquid was used in an amount of 45 parts by weight.

EXAMPLE 11
(preparation of pigment-dispersed liquid)

|  | parts by weight |
| --- | --- |
| Styrene/sodium acrylate copolymer (weight-average molecular weight 3000, styrene/acrylic acid = 75/25 mol, HLB calculated value 8.3) | 1.3 |
| Styrene/n-butyl methacrylate/sodium methacrylate terpolymer (weight-average molecular weight 5700, styrene/n-butyl methacrylate/methacrylic acid = 20/40/40 mol, HLB calculated value 12.2) | 0.7 |
| Copper phthalocyanine pigment (C. I. Pigment Blue-15) | 10 |
| Ultra pure water | 70 |
| (HLB difference 3.9, the average HLB of a mixture of dispersants = 9.7) | |

The above-described components were dispersed in the same manner as in Example 6 to obtain a dispersed liquid.
(preparation of ink)
An ink was prepared in the same manner as in Example 6 except that the above-mentioned dispersed liquid was used in an amount of 40 parts by weight.

Regarding these ink, the following tests were conducted.
(1) Ink Surface Tension
The surface tension of each ink was measured using Wilhelmy type surface tension measuring apparatus in the atmosphere of 23° C. and 55% RH.
(2) Ink Viscosity
The viscosity of each ink was measured at a shearing speed of 1400/s in the atmosphere of 23° C. and 55% RH.
(3) Ink pH
The pH value of each ink was measured using a glass electrode in the atmosphere of 23° C. and 55% RH.
(4) Dispersion Stability Test
Each ink (100 g) was charged in a glass tube having a lid. The glass tube was sealed with the lid, and was allowed to stand for 4 hours in the atmosphere of 70° C. and for 4 hours in the atmosphere of −20° C. This standing procedure at 70° C. and −20° C. was repeated for 4 times. The ink in the glass tube was filtered by a 1 μm filter with the ink being subjected to pressure. The time required for the ink to pass through the filter was measured, and the dispersion stability of each ink was evaluated according to the following standard.

○ . . . [(time for the ink which has been subjected to the above acceleration test to pass through the filter)/(time for the ink before the acceleration test to pass through the filter)×100−100] is less than 10%.

Δ . . . [(time for the ink which has been subjected to the above acceleration test to pass through the filter)/(time for the ink before the acceleration test to pass through the filter)×100−100] is greater than or equal to 10% and less than 20%.

X . . . [(time for the ink which has been subjected to the above acceleration test to pass through the filter)/(time for the ink before the acceleration test to pass through the filter)×100−100] is greater than or equal to 20%.

(5) Image Quality Test
Printing was conducted on FX-L paper (manufactured by Fuji Xerox Co., Ltd.) and 4024 paper (manufactured by Xerox Co., Ltd.) using a prototyped ink jet printer (thermal ink jet method, 600 dpi), and the resulting line images were evaluated according to the following standard.

○ . . . no blotting

Δ . . . slight blotting

X . . . blotting in the form of whisker in many parts (6) Paper Fixing Test

Printing was conducted on FX-L paper (manufactured by Fuji Xerox Co., Ltd.) and 4024 paper (manufactured by Xerox Co., Ltd.) using the prototyped machine used in (5), these recording media were allowed to stand for one day, then the image on each recording medium was rubbed with a cotton rod several times, and whether a stain around the image occurred was observed.

(7) Kogation Test

Printing was conducted on FX-L paper (manufactured by Fuji Xerox Co., Ltd.) by discharging ink successively from nozzles while applying $1 \times 10^8$ pulses per nozzle to the respective nozzles using the same printer as used in (5). The diameter of the resulting dot was measured, and variation in the dot diameter was evaluated according to the following standard.

⊚ . . . variation in dot diameter based on the initial dot diameter is less than 3%.

○ . . . variation in dot diameter based on the initial dot diameter is greater than or equal to 3% and less than 5%.

Δ . . . variation in dot diameter based on the initial dot diameter is greater than or equal to 5% and less than 10%.

X . . . variation in dot diameter based on the initial dot diameter is greater than or equal to 10%.

(8) Clogging Test 1

The printer used in (5), whose nozzles were not covered with caps, was allowed to stand in an atmosphere of 23° C. and 55% RH after discharging of the ink was stopped. Then, an image was formed by using the printer, and it was judged whether this image was of sufficient quality. If the image was of sufficient quality, the printer was again allowed to stand in an atmosphere of 23° C. and 55% RH after discharging of the ink was stopped. Again, an image was printed and the quality thereof was judged. This process was repeated, each time increasing the length of time until the formation of an image, until an image of insufficient quality was obtained. The period of time corresponding to the formation of the unsatisfactory image was used for evaluation. Clogging difficulty of the ink was evaluated according to the following standard.

⊚ . . . greater than or equal to 80 seconds

○ . . . greater than or equal to 60 seconds and less than 80 seconds

Δ . . . greater than or equal to 30 seconds and less than 60 seconds

X . . . less than 30 seconds (9) Clogging Test 2

The printer used in (5), whose nozzles were not covered with caps, was allowed to stand for one week, and then the nozzle was sucked by a suction apparatus installed in the printer, and the number of suction operations and the number of nozzles which could not discharge an ink were measured.

○ . . . all nozzles could discharge ink after one suction operation

Δ . . . all nozzles could discharge ink after two suction operations

X . . . some nozzles could not discharge ink after two suction operations

The results of the tests are shown in Table 1.

TABLE 1

| | HLB difference | Average HLB of a mixture of dispersants | Ink surface tension (mN/m) | Ink viscosity (mPa · s) | Ink pH | Dispersion stability test | Image quality test | Paper fixing test | Kogation test | Clogging test 1 | Clogging test 2 |
|---|---|---|---|---|---|---|---|---|---|---|---|
| Ex. 1 | 26.8 | 19.5 | 46 | 2.5 | 8.9 | ○ | ○ | ○ | ○ | ○ | ○ |
| Ex. 2 | 21.0 | 25.2 | 44 | 2.3 | 8.8 | ○ | ○ | ○ | ○ | ○ | ○ |
| Ex. 3 | 14.0 | 18.3 | 45 | 1.9 | 9.7 | ⊚ | ○ | ○ | ⊚ | ⊚ | ○ |
| Ex. 4 | 12.2, 19.9 | 22.3 | 42 | 2.0 | 9.8 | ⊚ | ○ | ○ | ⊚ | ⊚ | ○ |
| Ex. 5 | 28.3 | 19.3 | 50 | 1.8 | 8.8 | ○ | ○ | ○ | ○ | ○ | ○ |
| Ex. 6 | 2.5, 3.9 | 10.8 | 36 | 2.6 | 8.2 | ⊚ | ○ | ○ | ○ | ○ | ○ |
| Ex. 7 | 20.6, 9.1 | 22.2 | 35 | 2.5 | 8.3 | ○ | ○ | ○ | ○ | ○ | ○ |
| Ex. 8 | 20.6, 9.1 | 22.2 | 35 | 2.6 | 8.2 | ○ | ○ | ○ | ○ | ○ | ○ |
| Comp. Ex. 1 | — | 40.9 | 48 | 2.0 | 8.9 | X | ○ | X | X | Δ | Δ |
| Comp. Ex. 2 | — | 14.1 | 46 | 2.7 | 8.8 | Δ | ○ | ○ | X | X | Δ |
| Comp. Ex. 3 | — | 19.5 | 45 | 2.8 | 8.8 | Δ | ○ | ○ | Δ | X | X |
| Comp. Ex. 4 | 0 | 14.1 | 46 | 2.1 | 9.5 | Δ | ○ | ○ | X | X | X |
| Ex. 9 | 31.9 | 26.0 | 44 | 1.9 | 9.9 | Δ | ○ | ○ | Δ | Δ | Δ |
| Ex. 10 | 1.4 | 41.9 | 51 | 1.6 | 8.9 | Δ | ○ | Δ | Δ | Δ | Δ |
| Ex. 11 | 3.9 | 9.7 | 35 | 2.4 | 8.3 | ○ | ○ | ○ | Δ | Δ | Δ |

Ex: Example
Comp. Ex.: Comparative Example

As shown in Table 1, respective characteristics are cellent in Examples 1 to 11 in which HLB difference is from 1 to 30, and respective characteristics are particularly excellent in Examples 1 to 8 in which HLB difference is from 5 to 25. Further, particularly remarkable effects in the dispersion stability test, the kogation test and the clogging test 1 are obtained in Examples 3 and 4 in which HLB difference is from 12 to 20 and the average HLB of the dispersants is from 18 to 22.

What is claimed is:

1. An ink jet recording ink, comprising:

water;

a pigment;

a water-soluble organic solvent; and a plurality of dispersants each having a different HLB, given that respective HLBs of n (n≧2) kinds of dispersants are $HLB_1, HLB_2, \ldots, HLB_n$ and respective weights are $W_1, W_2, \ldots, W_n$, satisfying the following formula:

$$10 \leq (\Sigma(W_y \times HLB_y)/\Sigma W_y) \leq 40$$

(wherein y is an integer from 1 to n).

2. An ink jet recording ink according to claim 1, wherein, given that respective HLBs of n (n≧2) kinds of dispersants are such that $HLB_1 < HLB_2 < \ldots < HLB_n$, at least two dispersants satisfy the following formula:

$$1 \leq HLB_x - HLB_{x-1} \leq 30$$

(wherein X is an integer from 2 to n).

3. An ink jet recording ink according to claim 2, wherein said dispersants are polymers.

4. An ink jet recording ink according to claim 3, wherein weight-average molecular weights of said polymers are from 1000 to 30000.

5. An ink jet recording ink according to claim 1, wherein the content of said pigment is from 1 to 20% by weight.

6. An ink jet recording ink according to claim 1, wherein said dispersants are polymers.

7. An ink jet recording ink according to claim 6, wherein weight-average molecular weights are from 1000 to 30000.

8. An ink jet recording ink according to claim 1, wherein said dispersants are selected from the group consisting of polyester resin, vinyl polymer and polyamide resin.

9. An ink-jet recording ink according to claim 1, wherein the surface tension thereof is from 20 to 65 mN/m.

10. An ink jet recording ink according to claim 9, wherein the viscosity thereof is from 0.1 to 10.0 mPa·s.

11. An ink jet recording ink according to claim 1, comprising said dispersants in the range of 0.1 to 100 parts by weight to 100 parts by weight of said pigment.

12. An ink jet recording ink according to claim 1, comprising said dispersants in the range of 0.1 to 100 parts by weight to 100 parts by weight of said pigment.

13. An ink jet recording ink according to claim 8, wherein said dispersants are selected from the group consisting of styrene/styrenesulfonic acid copolymers, styrene/maleic acid copolymers, styrene/methacrylic acid copolymers, styrene/acrylic acid copolymers, vinylnaphthalene/maleic acid copolymers, vinylnaphthalene/methacrylic acid copolymers, vinylnaphthalene/acrylic acid copolymers, alkyl acrylate/acrylic acid copolymers, alkyl methacrylate/methacrylic acid copolymers, styrene/alkyl methacrylate/methacrylic acid terpolymers and styrene/alkyl acrylate/acrylic acid terpolymers.

14. An ink jet recording method comprising recording images by discharging ink drops from an orifice in accordance with recording signals, wherein an ink jet recording ink according to claim 1 is used as the ink for recording the images.

15. An ink jet recording method according to claim 14, further comprising discharging the ink by using a heater.

* * * * *